2,793,202
Patented May 21, 1957

2,793,202
POLYMERIZATION OF TRIFLUOROBROMO-ETHYLENE

John M. Hoyt, Woodside, N. Y., assignor to The M. W. Kellogg Company, Jersey City, N. J., a corporation of Delaware No Drawing. Application May 27, 1954,
Serial No. 432,887

11 Claims. (Cl. 260—92.1)

This invention relates to, and has for its object, the preparation of new and useful polymers of trifluorobromoethylene. More particularly, the invention relates to, and has for its object, the preparation of resinous thermoplastic homopolymers of trifluorobromoethylene having a wide variety of commercial uses and applications. The invention also relates to, and has as a still further object, a method for the preparation of these polymers. Other objects and advantages inherent in the invention, will become apparent to those skilled in the art from the following description and disclosure.

In accordance with this invention, trifluorobromoethylene is polymerized, as more fully hereinafter disclosed, to form a thermoplastic resinous homopolymer, by carrying out the polymerization reaction at temperatures between about —10° C. and about 25° C., in the presence of a polymerization catalyst, either as an inorganic promoter in the form of a water-suspension type recipe or as an organic peroxide promoter in mass or bulk-type polymerization. When the polymerization promoter is in the form of a water-suspension recipe, the reaction is preferably carried out at a temperature between about 10° C. and about 20° C. When the polymerization promoter is an organic peroxide promoter in a mass or bulk-type polymerization system, the reaction is preferably carried out at a temperature between about —5° C. and about 5° C. Of the two types of polymerization promoters that may be employed, the water-suspension type receipe is preferred.

When employing the water-suspension recipe type catalyst, as indicated above, a redox catalyst system is preferred, having no emulsifier. This redox catalyst system contains an oxidant, a reductant and a variable valence metal salt. The oxidant in the water-suspension type recipe is preferably a peroxy compound, i. e., compounds containing the peroxy linkage —O—O—. Preferred examples of these compounds are the inorganic persulfates, such as ammonium persulfate, sodium persulfate, or potassium persulfate. The reductant is preferably a bisulfite, such as sodium bisulfite or potassium bisulfite. The variable valence metal salt, which is employed for the purpose of regenerating the oxidant, is preferably in the form of an iron salt, such as ferrous sulfate, or ferrous nitrate, with ferrous sulfate being the most desirable variable valence metal salt.

It should be noted, in this respect, that the presence of the reductant and variable valence metal salt makes possible an increase in the quantity of free radicals, which facilitates the ease of polymerization. However, it is also within the scope of this invention to carry out the polymerization reaction with the aforementioned water-suspension type recipe, in which the recipe contains only an oxidant (e. g., one of the aforementioned peroxy compounds), and eliminates the presence of either the reductant or variable valence metal salt, or both.

As indicated above, the polymerization catalyst may also be present in the form of an organic peroxide promoter in a mass or bulk-type polymerization. Of these organic peroxide promoters, the halogen-substituted acetyl peroxides are employed in carrying out the polymerization reaction in the absence of a suspension agent. Trichloroacetyl peroxide is a preferred promoter of this type. Other halogen-substituted organic peroxides, suitable for carrying out the polymerization in a mass polymerization system, are trifluorodichloropropionyl peroxide, trifluoroacetyl peroxide, difluoroacetyl peroxide, 2,4-dichlorobenzoyl peroxide, chloroacetyl peroxide, and dichlorofluoroacetyl peroxide.

The following examples are offered for a better understanding of the present invention and are not to be construed as limiting its scope.

Example 1

This example is intended to illustrate the homopolymerization of trifluorobromoethylene employing a water-suspension type recipe in carrying out the polymerization reaction.

A 20 ml. glass polymerization tube is flushed with nitrogen, charged with 6 ml. of de-ionized water, and then frozen in a Dry Ice-acetone freezing mixture. There are next added, stepwise (allowing the contents of the tube to freeze after each addition), 2 ml. of a 2.5% aqueous solution of $(NH_4)_2S_2O_8$, 1 ml. of a 2.0% aqueous solution of $Na_2S_2O_5$ and 1 ml. of a 0.5% aqueous solution of $FeSO_4.7H_2O$.

By means of a vacuum transfer system, there is next condensed in the polymerization tube 5.0 gms. of trifluorobromoethylene. The polymerization tube and its contents are subsequently frozen in liquid nitrogen, evacuated, and then sealed. The polymerization reaction is accomplished by rotating the tube, end-over-end in a temperature controlled water-bath for 24.5 hours at 20° C. After freezing, in order to coagulate the polymer latex, the tube is opened. The polymer is next collected, washed with water, and dried at 35° C. in a vacuum to a constant weight. As a result of the above polymerization reaction and treatment, there is obtained 2.6 gms. (52% of the total monomer charged to the polymerization tube) of the homopolymer of trifluorobromoethylene, in the form of a white powder.

Analysis of the resinous thermoplastic homopolymer of trifluorobromoethylene, prepared by the above example, shows that fluorine is present in an amount of 36.58% (as compared with a theoretical 35.42%); and bromine is present in an amount of 46.97% (as compared with a theoretical 49.66%).

This powder is readily soluble in acetone and may be applied to various surfaces by painting, spraying, or dipping to form a resinous protective coating, which is chemically stable when subjected to environmental conditions in which it may come into contact with corrosive substances, such as, oils, fuels and various other powerful reagents.

The proportions of the components employed in the above-described polymerization of trifluorobromoethylene, corresponds to the following, preferred water-suspension type recipe:

| | Parts by weight |
|---|---|
| Water (distilled) | 200 |
| $CF_2=CFBr$ monomer | 100 |
| $(NH_4)_2S_2O_8$ | 1.0 |
| $Na_2S_2O_5$ | 0.4 |
| $FeSO_4.7H_2O$ | 0.1 |

It should be noted, however, that the quantity of water employed in the aforementioned water-suspension type recipe may vary, by weight, between about 100 to about 300 parts; the quantity of $(NH_4)_2S_2O_8$ may vary from between about 0.1 to about 5.0 parts; the quantity of Na$_2$S$_2$O$_5$ may vary from about 0.04 to about 2.0 parts; and the quantity of FeSO$_4$.7H$_2$O may vary from about 0.01 to about 0.5 part.

*Example II*

This example is intended to illustrate the preparation of a homopolymer of trifluorobromoethylene, employing an organic peroxide promoter in a mass or bulk-type polymerization system.

In a 20 ml. glass polymerization tube, flushed with nitrogen and washed in a Dry Ice-acetone bath, there is placed 0.037 part of trichloroacetyl peroxide in solution in Freon-11 (CCl$_3$F) at a temperature of about —60° C. Part of the Freon-11 solvent is flashed off on a vacuum transfer system without allowing the peroxide to warm appreciably.

Into the tube there is then condensed 100 parts of trifluorobromoethylene. The tube is frozen with liquid nitrogen, evacuated and sealed.

Polymerization is accomplished by allowing the tube to stand in a cooling bath at —5° C. for 7 days. At the end of this time, the tube is opened and the product collected and dried. A substantial amount of the homopolymer is obtained as a white powder.

As indicated above, the resinous thermoplastic polymers of trifluorobromoethylene, prepared in accordance with the process of this invention, are particularly suited and useful as durable, flexible coatings, for application to metal or fabric surfaces, which are subjected to environmental conditions in which they may come into contact with strong chemical reagents. For this purpose, the homopolymer may be dissolved in various solvents. A particularly useful solvent is acetone. Other types of preferred solvents comprise the aliphatic and aromatic esters, the ether alcohols, and other ketones, in addition to acetone. Typical examples of these solvents are diisobutyl ketone, methyl ethyl ketone, methyl isobutyl ketone, cyclohexanone, methoxy ethanol, ethoxy ethanol, ethoxy ethoxy ethanol, methyl acetate, butyl acetate and ethyl benzoate.

It should be noted that it is often desirable to reduce the molecular weight of the finished homopolymer of trifluorobromoethylene, of the present invention, in order to obtain greater solubility in organic solvents, such as those indicated above. This is of importance in order to vary the softness of the polymer for easier processability. The polymerization reactions which are carried out in the presence of the aforementioned polymerization type catalysts of the present invention may tend at times to form relatively high molecular weight homopolymeric products. Reduction of the strength of the recipe of the polymerization catalyst merely slows the rate of reaction without affecting, appreciably, the molecular weight of the finished homopolymer. It has been found, however, that the addition of various polymerization modifiers appreciably reduces the molecular weight of the homopolymeric products, and increases their solubility and ease of processability without affecting, unduly, the overall yield. Suitable polymerization modifiers include chloroform (CHCl$_3$), Freon 113 (CF$_2$ClCFCl$_2$), carbon tetrachloride (CCl$_4$), trichloroacetyl chloride (CCl$_3$COCl), dodecyl mercaptan (C$_{12}$H$_{25}$SH), and bromotrichloromethane (CBrCl$_3$). These modifiers are preferably added in amounts between about 1 to 10 parts, by weight, per 100 parts of trifluorobromoethylene monomer charged to the polymerization reaction. Of these modifiers, dodecyl mercaptan is preferred. This particular modifier appears to be much more powerful in function, than any of the others disclosed above and is, therefore, preferably employed in quantities ranging from 0.01 to 0.3 part per 100 parts of trifluorobromoethylene monomer charged to the polymerization reaction.

As indicated above, the resinous thermoplastic homopolymers of trifluorobromoethylene, prepared in accordance with the process of this invention, are adapted to a wide variety of commercial uses. Thus, they may be employed in the molding of films, fibers, adhesives, foils, various plastic materials, and in the coating of wire for purposes of electrical insulation. In addition, the polymer may be combined with various fillers, pigments or dyes, plasticizers, softeners and other resins, if so desired.

Among the aforementioned uses of the new resinous thermoplastic homopolymeric product of trifluorobromoethylene of the present invention, this homopolymer, in a preferred application, is highly useful as coatings for metallic surfaces employed in the manufacture of aircraft component parts, such as aluminum surfaces of tanks and other components, which are exposed to strong chemical reagents. These coatings may also take the form of protective suitings, protective envelopes, and other articles of manufacture which are comprised of exposed surfaces which may be subjected to abrasion, or other forms of impact in the course of performing their function under special environmental conditions. Particular applicability of the homopolymers of the present invention, is to be found when they are employed as protective coatings on surfaces, such as those stated above, which are to be subjected to environmental conditions in which they may come into contact with corrosive substances, such as oils, fuels and various powerful reagents, as previously described, and over a wide temperature range. These homopolymeric trifluorobromoethylene coatings are found to possess high tensile strength, good resinous properties, high heat-resistance, and ease of solubility in various solvents (such as those described above), when in their raw homopolymeric state for application to various surfaces. Of special importance is their quality of relatively high hardness.

When employed as protective coatings, for any of the surfaces described above, the raw homopolymeric product is dissolved in a suitable solvent, such as those previously described, to obtain an adherent coating. The raw homopolymer (and which may also include any of the aforementioned fillers, stabilizers, plasticzers, etc., if so desired), is dissolved in the solvent, preferably to an extent in which the total quantity of solids represents about 20 percent by weight of the entire coating composition. The coating is now applied to the surface to be treated, employing such apparatus as is commonly used for spraying, dipping, or brushing. After the wet coating has been applied to the desired surface, the solvent is permitted to evaporate from the surface of any of the aforementioned materials (and which may also be accomplished in the presence of elevated temperature, if so desired). After the solvent has completely evaporated, the coated surface is now ready for use. It should also be noted, that the coating composition containing the aforementioned resinous homopolymer of trifluorobromoethylene, may be applied to the surface either as a single coat, or if so desired, the protective coating may be built-up by the application of several layers of the coating composition, each layer being permitted to harden by solvent evaporation, before the next layer is applied.

Since certain changes may be made in carrying out the process of the present invention in producing the desired resinous thermoplastic homopolymer of trifluorobromoethylene, without departing from the scope of the invention, it is intended that all matter contained in the above description is to be interpreted as illustrative and not in a limiting sense.

I claim:

1. A method for forming a solid homopolymer of trifluorobromoethylene which comprises polymerizing trifluorobromoethylene in the presence of a polymerization promoter comprising a peroxy compound of the group consisting of inorganic persulfates and halogen-substituted acetyl peroxides at a temperature between about —10° C. and about 25° C.

2. A method for forming a solid homopolymer of trifluorobromoethylene which comprises polymerizing trifluorobromoethylene in the presence of a polymerization promoter comprising a peroxy compound of the group consisting of inorganic persulfates and halogen-substituted acetyl peroxides at a temperature between about 10° C. and about 20°C.

3. A method for forming a solid homopolymer of trifluorobromoethylene which comprises polymerizing trifluorobromoethylene in the presence of a polymerization promoter comprising an inorganic persulfate at a temperature between about −10° C. and about 25° C.

4. A method for forming a solid homopolymer of trifluorobromoethylene which comprises polymerizing trifluorobromoethylene in the presence of a polymerization promoter comprising a halogen-substituted acetyl peroxide at a temperature between about −10° C. and about 25° C.

5. A method for forming a solid homopolymer of trifluorobromoethylene which comprises polymerizing trifluorobromoethylene in the presence of a polymerization promoter comprising an inorganic persulfate at a temperature between about 10° C. and about 20° C.

6. A method for forming a solid homopolymer of trifluorobromoethylene which comprises polymerizing trifluorobromoethylene in the presence of a polymerization promoter comprising a halogen-substituted acetyl peroxide at a temperature between about −5° C. and about 5° C.

7. A method for forming a solid homopolymer of trifluorobromoethylene which comprises polymerizing trifluorobromoethylene in the presence of a polymerization promoter comprising ammonium persulfate in an aqueous system at a temperature between about 10° C. and about 20° C.

8. A method for forming a solid homopolymer of trifluorobromoethylene which comprises polymerizing trifluorobromoethylene in the presence of a polymerization promoter comprising sodium persulfate in an aqueous system at a temperature between about 10° C. and about 20° C.

9. A method for forming a solid homopolymer of trifluorobromoethylene which comprises polymerizing trifluorobromoethylene in the presence of a polymerization promoter comprising potassium persulfate in an aqueous system at a temperature between about 10° C. and about 20° C.

10. A method for forming a solid homopolymer of trifluorobromoethylene which comprises polymerizing trifluorobromoethylene in the presence of a polymerization promoter comprising trichloroacetyl peroxide at a temperature between about −5° C. and about 5° C.

11. A method for forming a solid homopolymer of trifluorobromoethylene which comprises polymerizing trifluorobromoethylene in the presence of a polymerization promoter comprising trifluorodichloropropionyl peroxide at a temperature between about −5° C. and about 5° C.

References Cited in the file of this patent

UNITED STATES PATENTS

| | | |
|---|---|---|
| 2,497,046 | Krop | Feb. 7, 1950 |
| 2,600,202 | Caird | June 10, 1952 |
| 2,689,241 | Dittman | Sept. 14, 1954 |

FOREIGN PATENTS

| | | |
|---|---|---|
| 593,605 | Great Britain | Oct. 21, 1947 |